(12) United States Patent
Li

(10) Patent No.: US 8,261,034 B1
(45) Date of Patent: Sep. 4, 2012

(54) MEMORY SYSTEM FOR CASCADING REGION-BASED FILTERS

(75) Inventor: Weining Li, Los Gatos, CA (US)

(73) Assignee: Ambarella, Inc., Santa Clara, CA (US)

( * ) Notice: Subject to any disclaimer, the term of this patent is extended or adjusted under 35 U.S.C. 154(b) by 420 days.

(21) Appl. No.: 12/638,205

(22) Filed: Dec. 15, 2009

(51) Int. Cl.
*G06F 12/00* (2006.01)
(52) U.S. Cl. .................. 711/165; 711/161; 711/162
(58) Field of Classification Search .............. 711/165, 711/161, 162
See application file for complete search history.

(56) References Cited

U.S. PATENT DOCUMENTS

2009/0228670 A1 * 9/2009 Nakagawa et al. ........... 711/162
* cited by examiner

*Primary Examiner* — Yong Choe
(74) *Attorney, Agent, or Firm* — Christopher P. Maiorana, PC

(57) ABSTRACT

A method for moving data in a memory system of a cascading region-based filter is disclosed. The method generally includes steps (A) to (C). Step (A) may load a first portion of the data from a buffer to the memory system at a start of a given cycle using a control circuit. The memory system generally has multiple first memories. A first region of a particular first memory may receive the first portion of data. Step (B) may copy the data in a second region of the particular first memory to a third region of the particular first memory at an end of the given cycle. Step (C) may copy the data in an output region of the particular first memory to an input region of a next first memory at the end of the given cycle. The output region generally overlaps both the first region and the second region.

20 Claims, 5 Drawing Sheets

MEMORY SYSTEM FOR CASCADING REGION-BASED FILTERS

FIELD OF THE INVENTION

The present invention relates to a method and/or architecture for filter memories generally and, more particularly, to a memory system for cascading region-based filters.

BACKGROUND OF THE INVENTION

Conventional filtering of a point of interest in an image is often based on image data in a local region around the point.

For each point of interest, the local image data is read from a main buffer into the filter. Where multiple points of interest are in close proximity to each other, the same image data is commonly read from the main buffer multiple times, once for each point.

It would be desirable to minimize the number of times that the image data is access from the main buffer when filtering the entire image.

SUMMARY OF THE INVENTION

The present invention concerns a method for moving data in a memory system of a cascading region-based filter. The method generally includes steps (A) to (C). Step (A) may load a first portion of the data from a buffer to the memory system at a start of a given cycle using a control circuit. The memory system generally has a plurality of first memories. A first region of a particular one of the first memories may receive the first portion of the data. Step (B) may copy the data in a second region of the particular first memory to a third region of the particular first memory at an end of the given cycle. Step (C) may copy the data in an output region of the particular first memory to an input region of a next of the first memories at the end of the given cycle. The output region generally overlaps both the first region and the second region.

The objects, features and advantages of the present invention include providing a memory system for cascading region-based filters that may (i) minimize bandwidth between the filters and a buffer, (ii) recycle operands in a cost-effective way and/or (iii) provide a consistent logical view on a client side of the filters.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
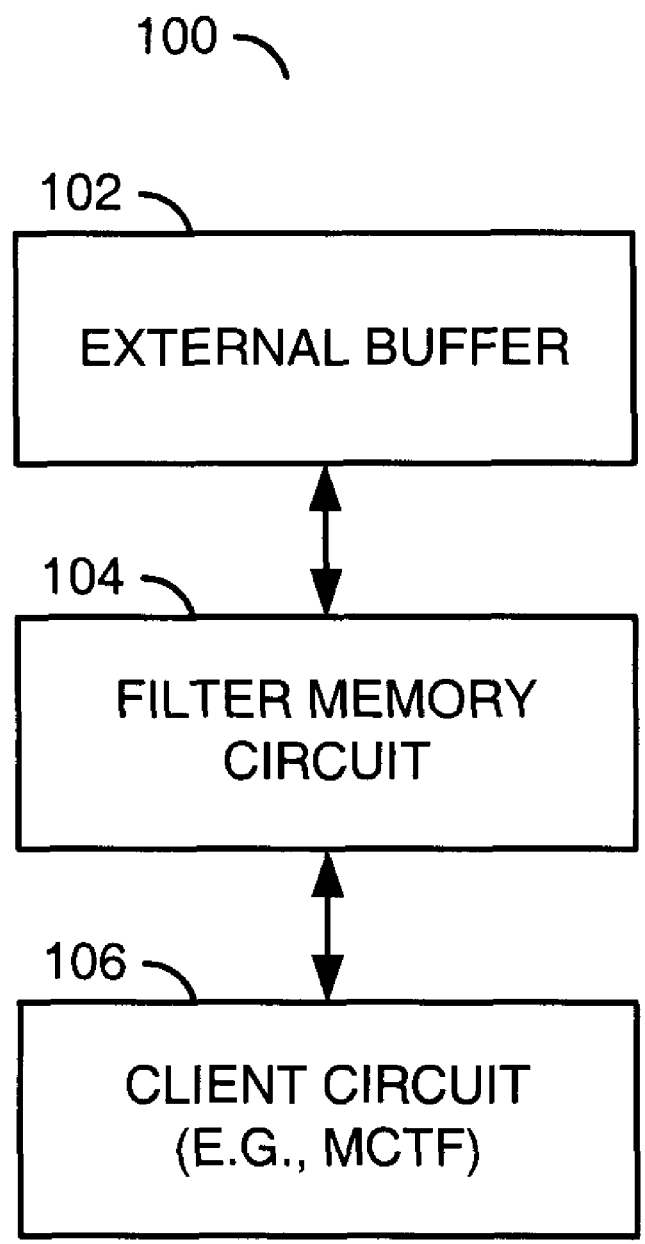
FIG. 1 is a block diagram of an example implementation of an apparatus.

Referring to FIG. 1, a block diagram of an example implementation of an apparatus 100 is shown. The apparatus (or system) 100 generally comprises a circuit (or module) 102, a circuit (or module) 104 and a circuit (or module) 106. The circuits 102 to 106 may be implemented in hardware, software, firmware or any combination thereof.

The circuit 102 may implement a buffer or memory. The circuit 102 is generally operational to buffer multidimensional (e.g., two-dimensional) data having one or more channels. The two-dimensional data may include, but is not limited to, fields, frames, picture, images, operands and the like. In some embodiments, the circuit 102 may be fabricated on a first die or chip. The circuit 102 may be referred to as an external memory and/or an external buffer.

The circuit 104 may implement a filter memory circuit. The circuit 104 is generally operational to present and shift the multidimensional data during multiple filter cycles. The circuit 104 may comprise multiple interconnected memory blocks arranged in multiple stages. In some embodiments, the circuit 104 may be fabricated on a second die or chip. In other embodiments, the circuit 104 may be fabricated on the said die or chip as the circuit 102.

The circuit 106 generally implements one or more clients of the multidimensional data. The circuit 106 is generally operational to filter the multidimensional data buffered in the circuit 104 during multiple filter cycles. In some embodiments, the circuit 106 may be fabricated on a third die or chip. In other embodiments, the circuit 106 may be fabricated on the same die or chip as the circuits 102 and/or 104.

The circuits 104 and 106 may form multiple cascading filters. Each filter is generally designed to operate on region-based data. The operations of the cascading filters generally complete in a single or a few filter cycles. In some embodiments, the circuits 104 and 106 may be configured as a motion compensated temporal filter (MCTF). Other region-based filter configurations may be implemented to meet the criteria of a particular application.

Figure 2:
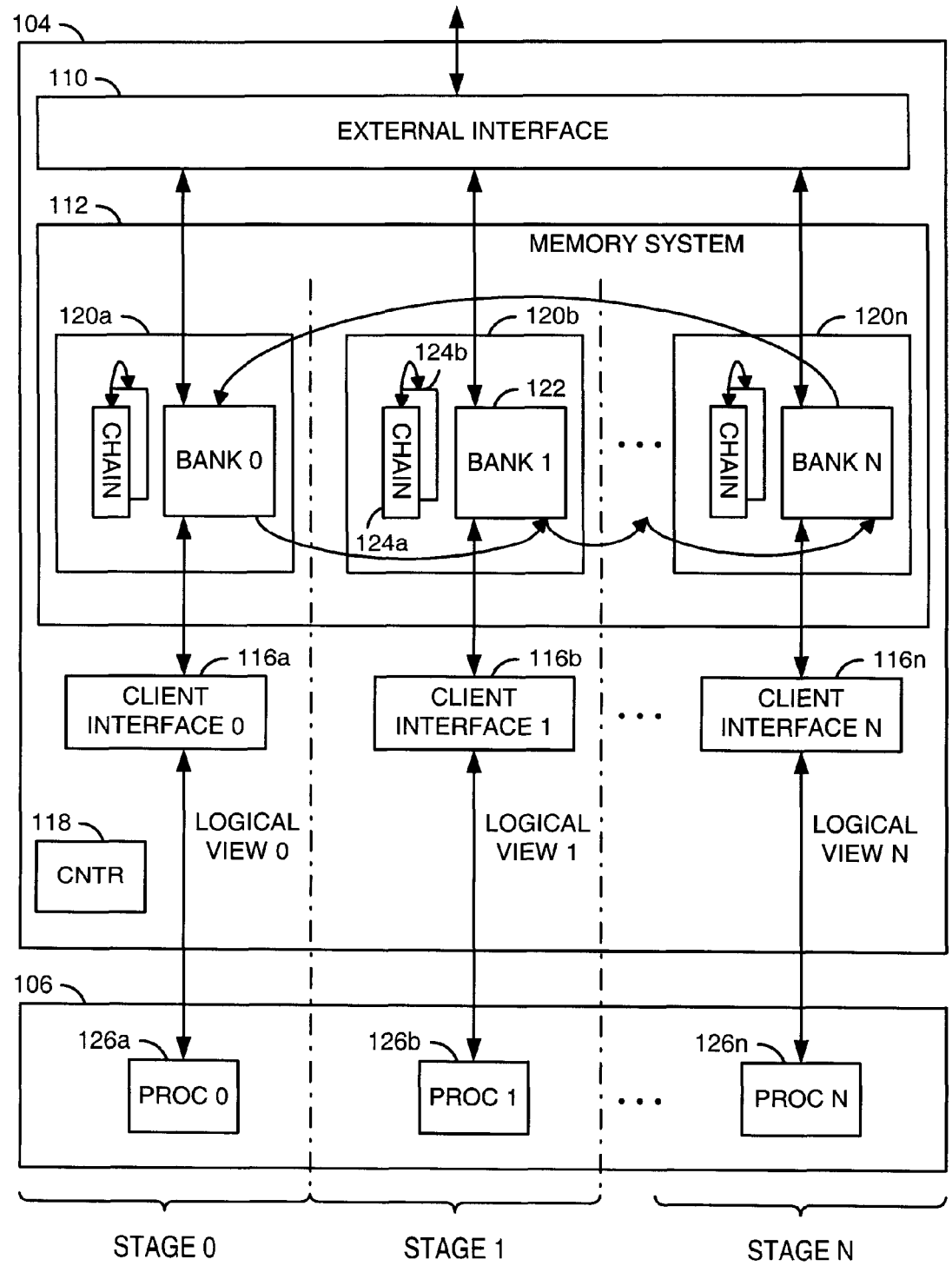
FIG. 2 is a block diagram of example portions of a filter memory circuit and a client circuit of the apparatus in accordance with a preferred embodiment of the present invention.

Referring to FIG. 2, a block diagram of example portions of the circuit 104 and the circuit 106 is shown in accordance with a preferred embodiment of the present invention. The circuit 104 generally comprises a circuit (or block) 110, a circuit (or block) 112, multiple circuits (or blocks) 116a-116n and a circuit (or block) 118. The circuit 104 may be divided into N+1 stages (e.g., stage 0 to stage N). Each stage generally corresponds to a single cascading filter. The circuits 110 to 118 may be implemented in hardware, software, firmware or any combination thereof.

The circuit 110 generally implements an external memory interface. The circuit 110 may be operational to store and load data between the circuit 102 and the circuit 112. The circuit 104 may have a single interface to the circuit 110. Multiple (e.g., N+1) interfaces may exist between the circuit 110 and the circuit 112, a single interface corresponding to each of the N+1 stages.

The circuit 112 may implement a memory system. The circuit 112 is generally operational to temporarily hold the data being filtered. The circuit 112 may have multiple (e.g., N+1) interfaces to the circuit 116a-116n, a single interface corresponding to each of the circuits 116a-116n. The circuit 112 may be arranged as the multiple stages. Each stage may be coupled to a neighboring stage with a last of the stages wrapping around to couple back to an initial stage. All of the stages may send and receive data to and from the circuit 102 through the circuit 110. Each stage may send and receive data to and from the circuit 106 through the circuits 116a-116n.

The circuits 116a-116n may implement client interface circuits. Each circuit 116a-116n is generally operational to present a corresponding logical view of the data as buffered in each stage to the circuit 106. A logical view generally includes some or all of the data currently stored in the corresponding stage of the circuit 112. Transfers of data through the circuits 116a-116n may be bi-directional.

The circuit 118 generally implements a control circuit. The circuit 118 may be operational to control the movement of data between (i) the circuit 110 and the circuit 112, (ii) the circuit 112 and the circuits 116a-116n, (iii) between the stages within the circuit 112 and (iv) internal to the stages.

The circuit 112 generally comprises multiple memory blocks (or sections) 120a-120n. Each block 120a-120n may implement an addressable range of memory configured as a multidimensional (e.g., two-dimensional) area. The area may be viewed as a collection of a memory bank 122 and multiple (e.g., 2) memory chains 124a-124b. Data may be moved (i) in and out of the stages, (ii) inter-stage from block-to-block and (iii) intra-stage from chain-to-chain under the control of the circuit 118. The in/out data transfers may take place between (i) the circuit 110 and the blocks 120a-120n and (ii) the circuits 116a-116n and the blocks 120a-120n. Inter-stage transfers generally involve moving data from a given stage to a neighboring stage, with an optional wrap around from the last stage back to the first stage. Intra-stage transfers generally involve moving portions of the data between the chains 124a-124b within each stage.

In some embodiments, the circuit 106 may comprise multiple circuits 126a-126n. The circuits 126a-126n may be in communication with the respective circuits 116a-116n to access the multidimensional data in the blocks 120a-120n. The circuits 126a-126n may implement processor circuits. Each circuit 126a-126n may be operational to process the data stored in the corresponding stage of the circuit 112. The circuits 126a-126n may be considered logical clients of the circuit 112. The circuits 126a-126n combined may implement a cascading filter circuit. Each individual circuit 126a-126n may be operational to process a region of the multidimensional data at any given time. The processing may involve one or more processor cycles of each circuit 126a-126n. In some embodiments, a single processor cycle may last as long as a filter cycle. In other embodiments, multiple processor cycles may be performed during a single filter cycle.

When filtering two-dimensional data, the output data generated by a rectangular region-based filter is generally dependent upon at least a neighboring (2 m+1)×(2 n+1) region. For example, a region of (a+2 m)×(b+2 n) input samples may be used to generate an a×b set of results. Where the region-based filter is arranged as several cascading filters, at least a portion of the output data generated by each stage of the filter may be used as input data transferred to the next stage. Furthermore, all of the stages may generate a same size (e.g., a×b) of output data.

Figure 3:
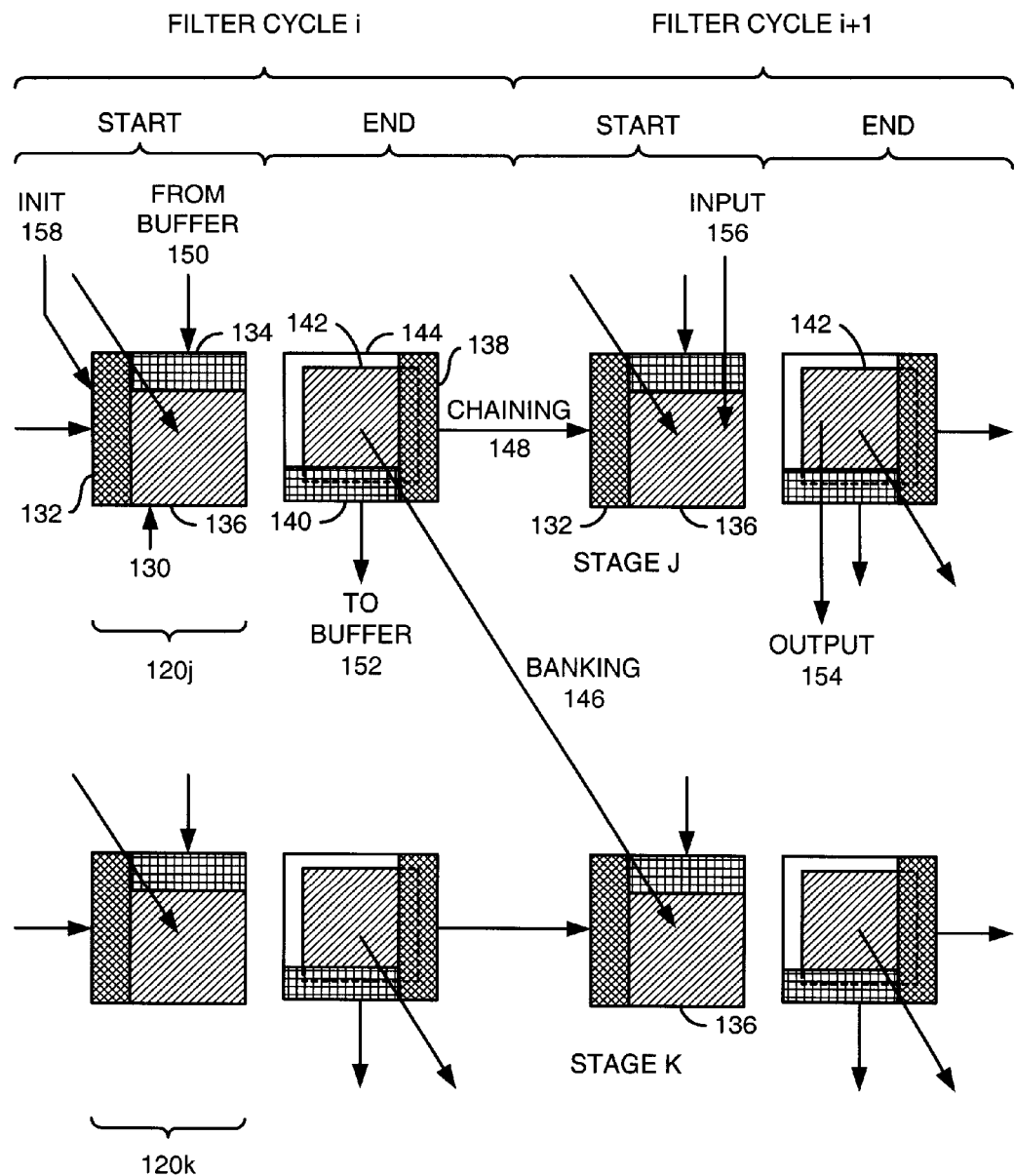
FIG. 3 a partial block diagram of a first example implementation of a memory system is shown over two sequential filter cycles.

Referring to FIG. 3, a partial block diagram of a first example implementation of the circuit 112 is shown over two sequential filter cycles. A block 120j is generally illustrated in a stage J and a block 120k in a stage K (e.g., stage J+1). Each of the blocks 120j and 120k are illustrative of the corresponding bank 122 and chains 124a-124b arranged in a rectangular area 130.

Each area 130 may be treated as multiple regions 132-136. By way of example, consider a single area 130 having dimensions of a+2 m horizontally and b+2 n vertically, wherein m is at least one and n is at least one. A left region 132 (e.g., 2 m×(b+2 n)) of the area 130 may reside adjoining a left edge of the area 130. The region 132 generally extends vertically from a top row to a bottom row of the area 130. Horizontally, the region 132 may extend from the leftmost row across multiple rows to the right. A top region 134 (e.g., a×2 n) may reside adjoining a top edge of the area 130. The region 134 generally extends vertically from the top row down several rows and horizontally from the region 132 to the rightmost column of the area 130. The region 136 (e.g., a×b) generally occupies the rest of the space in area 130 not already within the regions 132 and 134. The region 136 may adjoin the region 132 on one side, the region 134 on another side, the bottom edge of the area 130 and the right edge of the area 130.

Each area 130 may also be treated as multiple regions 138-144. A right region 138 (e.g., 2 m×(b+2 n)) may reside adjoining a right edge of the area 130. The region 138 generally extends from a rightmost column across multiple columns to the left. A bottom region 140 (e.g., a×2 n) may reside adjoining a bottom edge of the area 130. The region 140 generally extends vertically from the bottom row across multiple rows upward. Horizontally, the region 140 generally adjoins the region 138 and extends to the leftmost column of the area 130. A region 142 (e.g., a×b) may be centered in the area 130. The region 142 may overlap the regions 138 and 140. A region 144 may occupy the remaining space in the area 130 not already within the regions 138, 140 and 142.

Movement of data into, out of, within and among the blocks generally involves several transfer operations. Some to all of the transfer operations may be controlled by the circuit 118.

A "banking" transfer operation may involve passing data from one filter stage (e.g., region 142 in stage J) to the next stage (e.g., region 136 in stage K) at each filter cycle boundary (e.g., end of filter cycle i and/or beginning of filter cycle i+1). An example banking data transfer is generally illustrated as arrow 146.

A "chaining" transfer operation may retain data within each filter stage at each filter cycle. For example, the data held in the region 138 of the stage J at the end of filter cycle i may be transferred to the region 132 of the stage J for use by the circuit 126j in the filter cycle i+1. An example chaining data transfer is generally illustrated as arrow 148. A "load" transfer operation may involve copying data from the circuit 102 into the region 134. The load transfers may be performed at the beginning of each filter cycle. An example load data transfer is generally illustrated as arrow 150.

A "store" transfer operation may involve transferring data from the region 140 to the circuit 102. The store transfers may be performed at the end of each filter cycle. An example store data transfer is generally illustrated as arrow 152.

An "output" transfer operation may involve transferring the region 142 to the corresponding circuits 116a-116n. The output transfers may be performed at the end of the filter cycles. An example output transfer may be illustrated as arrow 154.

An "input" transfer operation generally involves copying data from the circuit 102 into the region 136. The input transfers may be performed at the beginning of the filter cycles. An example input transfer may be illustrated as arrow 156.

An "initialization" transfer operation generally involves transferring data from the circuit 102 into the region 132. The initialization transfers, buffer transfers and input transfers may be performed at the start of an initial cycle to load an initial set of data into the stages. An example initialization transfer may be illustrated as arrow 158

A "filter" transfer operation generally involves transferring data between the area 130 and the corresponding circuits 126a-126n. The filter transfers may be performed one or more time during each filter cycle in support of the filter processes implemented in the circuits 126a-126n. Control of the filter transfers may be performed by the circuits 126a-126n and/or the circuit 118. For an apparatus 100 implementing an s-stage cascading filter, a bandwidth reduction for the circuit 102 of $((s-1) \times a \times b) + \Sigma(m \times (b+2 n))$ accesses may be realized compared with standard designs.

Figure 4:
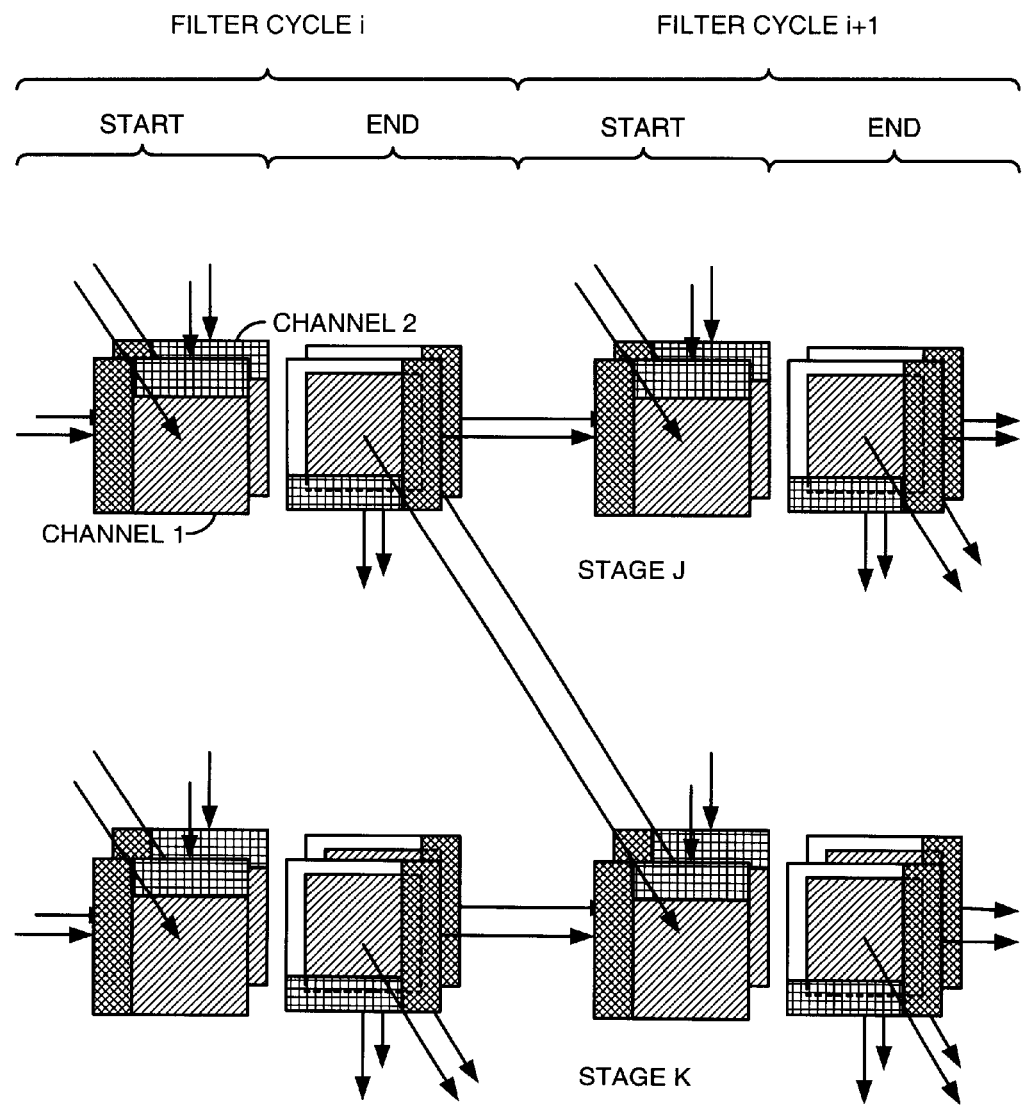
FIG. 4 is a partial block diagram of a second example implementation of the memory system is shown over two sequential filter cycles.

Referring to FIG. 4, a partial block diagram of a second example implementation of the circuit 112 is shown over two sequential filter cycles. In some embodiments involving data having multiple channels, a filter may take and generate a vector of results at each location (e.g., YUV data). Therefore, the circuit 112 may be duplicated as two or more memory channels, one memory channel for each corresponding data channel. The circuit 118 may share control of the multiple channels with the same commands being given to each channel in parallel. For example, a banking operation may involve simultaneously transferring two sets of data, one set in each channel, from the stage J to the stage K.

Figure 5:
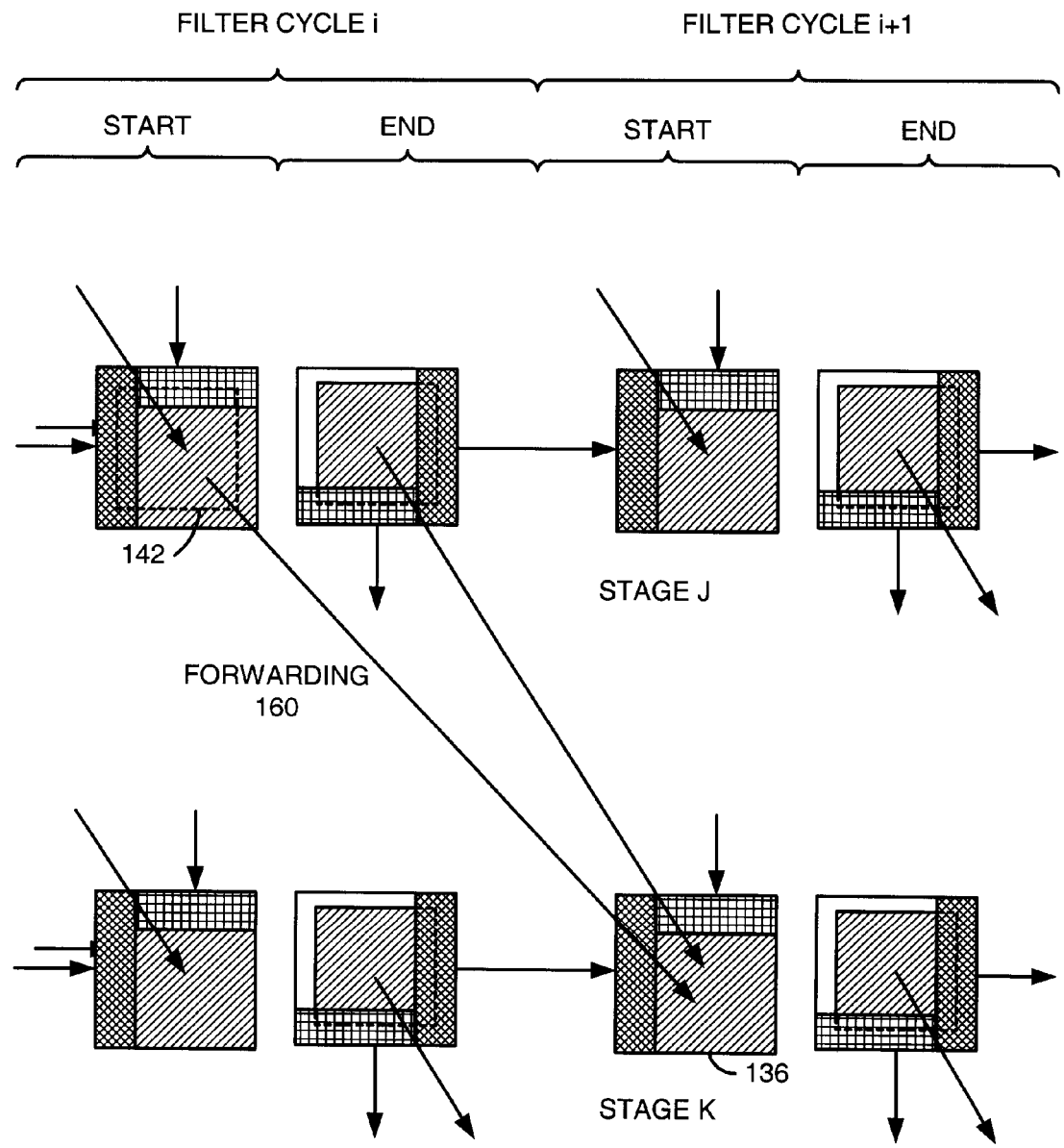
FIG. 5 is a partial block diagram of a third example implementation of the memory system is shown over two sequential filter cycles.

Referring to FIG. 5, a partial block diagram of a third example implementation of the circuit 112 is shown over two sequential filter cycles. In embodiments involving the multiple data channels, one of the channels may receive the input data set of a previous filter stage at the start of a particular filter cycle, instead of at the end of the particular filter cycle. Further bandwidth saving may be achieved by forwarding the region 142 data of one stage to the region 136 of the next stage such that the same set of data is buffered in both stages at the start of a filter cycle. An example "forwarding" transfer operation is generally illustrated as arrow 160. The rest of the transfers generally remain the same as illustrated in FIGS. 3 and 4.

The functions performed by the diagrams of FIGS. 1-5 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. A method for moving data in a memory system of a cascading region-based filter, comprising the steps of:
    (A) loading a first portion of said data from a buffer to said memory system at a start of a given cycle using a control circuit, wherein (i) said memory system comprises a plurality of first memories and (ii) a first region of a particular one of said first memories receives said first portion of said data;
    (B) copying a second portion of said data in a second region of said particular first memory to a third region of said particular first memory at an end of said given cycle; and
    (C) copying a third portion of said data in an output region of said particular first memory to an input region of a next of said first memories at said end of said given cycle, wherein said output region overlaps both said first region and said second region.

2. The method according to claim 1, further comprising the step of:
    storing a fourth portion of said data in a fourth region of said particular first memory into said buffer at said end of said given cycle.

3. The method according to claim 1, further comprising the step of:
    copying said third portion of said data in said output region of said particular first memory to a client interface at said end of said given cycle.

4. The method according to claim 1, further comprising the step of:
    copying a fourth portion of said data in an output region of a last of said first memories to an input region of an initial one of said first memories at said end of said given cycle.

5. The method according to claim 1, wherein (i) said first region, said second region, said third region and a fourth region of said particular first memory adjoin a first side, a second side, a third side and a fourth side respectively of an area defined by said particular first memory and (ii) said second side is opposite said third side.

6. The method according to claim 1, wherein an input region of said particular first memory adjoins both said first region and said third region of said particular first memory.

7. The method according to claim 1, further comprising the step of:
   loading a fourth portion of said data from said buffer to a particular one of a plurality of second memories of said memory system, wherein loading said fourth portion to said particular second memory is performed in parallel with loading said first portion to said particular first memory.

8. The method according to claim 7, wherein said first memories buffer a first channel of said data and said second memories buffer a second channel of said data.

9. The method according to claim 1, further comprising the step of:
   copying said third portion of said data in said output region of said particular first memory to said input region of said next first memory at said start of said given cycle.

10. The method according to claim 1, wherein said cascading region-based filter is configured as a motion compensated temporal filter.

11. An apparatus comprising:
   a memory system comprising a plurality of first memories; and
   a control circuit configured to (i) load a first portion of data from a buffer to said memory system at a start of a given cycle, a first region of a particular one of said first memories receiving said first portion of said data, (ii) copy a second portion of said data in a second region of said particular first memory to a third region of said particular first memory at an end of said given cycle and (iii) copy a third portion of said data in an output region of said particular first memory to an input region of a next of said first memories at said end of said given cycle, wherein said output region overlaps both said first region and said second region.

12. The apparatus according to claim 11, wherein said control circuit is further configured to store a fourth portion of said data in a fourth region of said particular first memory into said buffer at said end of said given cycle.

13. The apparatus according to claim 11, wherein said control circuit is further configured to copy said third portion of said data in said output region of said particular first memory to a client interface at said end of said given cycle.

14. The apparatus according to claim 11, wherein control circuit is configured to copy a fourth portion of said data in an output region of a last of said first memories to an input region of an initial one of said first memories at said end of said given cycle.

15. The apparatus according to claim 11, wherein (i) said first region, said second region, said third region and a fourth region of said particular first memory adjoin a first side, a second side, a third side and a fourth side respectively of an area defined by said particular first memory and (ii) said second side is opposite said third side.

16. The apparatus according to claim 11, wherein an input region of said particular first memory adjoins both said first region and said third region of said particular first memory.

17. The apparatus according to claim 11, wherein (i) said control circuit is further configured to load a fourth portion of said data from said buffer to a particular one of a plurality of second memories of said memory system and (ii) loading said fourth portion to said particular second memory is performed in parallel with loading said first portion to said particular first memory.

18. The apparatus according to claim 17, wherein said first memories buffer a first channel of said data and said second memories buffer a second channel of said data.

19. The apparatus according to claim 11, wherein said control circuit is further configured to copy said third portion of said data in said output region of said particular first memory to said input region of said next first memory at said start of said given cycle.

20. An apparatus comprising:
   means for storing comprising a plurality of first memories; and
   means for controlling configured to (i) load a first portion of data from a buffer to said means for storing at a start of a given cycle, a first region of a particular one of said first memories receiving said first portion of said data, (ii) copy a second portion of said data in a second region of said particular first memory to a third region of said particular first memory at an end of said given cycle and (iii) copy a third portion of said data in an output region of said particular first memory to an input region of a next of said first memories at said end of said given cycle, wherein said output region overlaps both said first region and said second region.

* * * * *